Feb. 6, 1968 D. E. BELL 3,367,018
METHOD FOR STRAIGHTENING CAKE DECORATING TUBES
Filed Oct. 22, 1965

INVENTOR.
DEAN E. BELL
BY B. E. Shlesinger

ATTORNEY 3,367,018
METHOD FOR STRAIGHTENING CAKE
DECORATING TUBES
Dean E. Bell, 51 Curtice Road, Irondequoit,
N.Y. 14617
Filed Oct. 22, 1965, Ser. No. 501,834
3 Claims. (Cl. 29—401)

ABSTRACT OF THE DISCLOSURE

The inwardly bent teeth on the serrated end of a hollow, conical cake decorating tube are straightened by inserting the pointed end of a solid, conical member successively through the larger and smaller ends, respectively, of the tube, and by applying sufficient axial pressure to the base of the solid member to cause its conical surface to force the bent teeth radially outwardly. A second, hollow, conical member, such as a second decorating tube, may be placed over the serrated end of the first tube to force its outwardly bent teeth radially inwardly, when pressure is applied to the base of the solid member.

---

This invention relates to cake decorating tubes, and more particularly to a method for straightening the serrated edges of such tubes.

Commercial bakeries must maintain a large supply of variously shaped cake decorating tubes through which butter frostings and the like are extruded onto the cake for decorating its surface with various designs. These tubes are used also in bakeries for extruding cookie batter into various shapes, and in restaurants for extruding mashed potatoes into decorative forms. In one form a conventional decorating tube of the type described comprises a hollow, segmental cone, which is open at both ends. The smaller end of the cone is serrated so that its has a sawtooth configuration.

In use, the tube is placed in the bottom of a flexible rubber bag, or the like, with the smaller, serrated end of the tube projecting out of a hole in the bottom of the bag. The bag is then filled with a pastry batter or frosting; and the bag is then squeezed so that the batter or frosting is forced through the larger end of the cone, and out through the smaller, serrated end thereof, so that it is extruded in the form of a continuous ribbon having a longitudinally extending wavy surface.

These cone-shaped tubes are usually made of a fine gauge metal, whereby the teeth or pointed projections on the serrated end of a tube tend to bend easily, so that in the normal course of their use, storage, or washing, a number of the teeth are often accidentally bent inwardly or outwardly with respect to the conical surface of the tube in which they are supposed to lie. As a result, the extruded matter does not assume the desired, wavy configuration, until the teeth are once again bent back into registry with this conical surface.

An object of this invention is to provide a novel method for straightening the teeth in cake decorating tubes of the type described.

A more particular object of this invention is to provide a relatively simple and inexpensive method for straightening the teeth on tubes of the type described.

Other objects of the invention will become apparent hereinafter from the recital of the appended claims, particularly when read in conjunction with the accompanying drawing.

Figure 1:
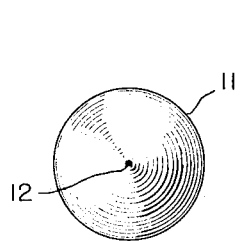
FIG. 1 is a plan view of an instrument for repairing cake decorating tubes in accordance with one embodiment of this invention.
Figure 2:
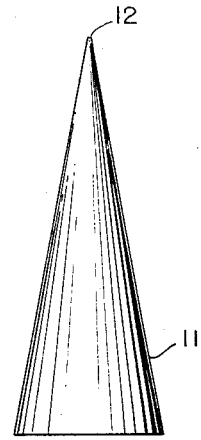
FIG. 2 is a front elevational view of this instrument.
Figure 3:
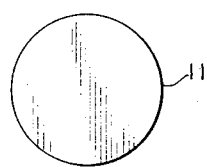
FIG. 3 is a bottom plan view of this instrument.

Referring now to the drawing by numeral of reference, 11 designates a cake decorator tube straightening instrument. This instrument comprises a solid, cone-shaped member, which may be made of metal, wood, plastic, or the like.

Two segmental-conical cake decorator tubes are designated at 13 and 16, respectively. The cone angles of these two tubes are substantially identical; and the smaller end of each of the tubes 13 and 16 is serrated to form thereon a plurality of pointed projections or teeth 14 and 17, respectively, which are arranged in circumferentially spaced relation to one another coaxially about the axial centerline of its respective tube. If the tubes 13 and 16 are to function properly, when used to dispense batter, or frosting onto the surface of a cake, it is essential that all of their teeth 14 and 17, respectively, lie approximately in the conical surface defined by the respective conical member 13 or 16.

Figure 4:
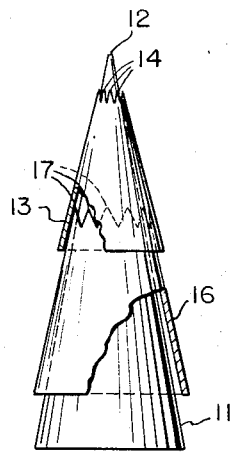
FIG. 4 is a view similar to FIG. 2, but illustrating the manner in which cake decorating tubes of the type described are adapted to be mounted on this instrument for the purpose of straightening the serrated ends of the tubes.

In most commercial bakeries it is customary to maintain a large supply of cone-shaped tubes similar to the tubes 13 and 16. All of the tubes in one such family or group thereof have identical cone angles and their smaller ends are serrated, but differ from one another slightly in height. For example, the tube 16 is illustrated in FIG. 4 has approximately the same cone angle as the tube 13, but has a greater axial length, or height, than the tube 13. Moreover, at its smaller end, the tube 16 has a larger opening, or diameter, than the smaller end of the tube 13; and the teeth 17 formed at the smaller end of the tube 16 are larger, and are spaced slightly further apart from one another, than are the teeth 14 on the smaller tube 13.

Although not illustrated, it is to be understood that a number of additional tubes, which have cone angles approximately equal to the cone angles of the tubes 13 and 16, are usually maintained in the conventional bakery for the purpose of applying to cakes, and the like, ribbons of frosting which would differ in size from those that result from the use of decorator tubes 13 and 16. At their smaller ends these other tubes are either larger or smaller in diameter than the corresponding ends of the tubes 13 and 16, depending upon the desired ribbon size. Like the tubes 13 and 16, the smaller ends of these additional tubes are serrated to provide thereon a plurality of teeth similar to those illustrated at 14 and 17.

If any of the teeth 14 on the tube 13 happen to be accidentally bent inwardly toward the axis of the tube, one need only to press the pointed end 12 of the member 11 firmly through the smaller end of the tube as illustrated in FIG. 4, whereby the conical surface of the member 11 will cause the inwardly bent tooth, or teeth 14, to be bent outwardly, and back into alignment with the cone surface of the member 13. The teeth 17 on the decorator 16 may be repaired in a similar manner, merely by pressing the pointed end 12 of the member 11 firmly through the serrated end of the decorator tube 16 as illustrated in FIG. 4.

If for some reason one or more of the teeth on, for instance, the tube 16 happen to become bent outwardly from the plane of the segmental cone tube 16, such teeth may be forced back into the correct position by inserting the smaller, serrated end of the tube 16 into the smaller tube 13 coaxially thereof. The pointed end of the member 11 is then pressed firmly and successively through the serrated end of the tube 16, and the serrated end of the tube 13, so that the conical surface of the member 11 creates a radial pressure against the outwardly bent tooth, or teeth, 17 of the tube 16, whereby the inner conical surface of the tube 13 forces the outwardly bent tooth, or teeth 17, back into the conical plane defined by the tube 16.

From the foregoing it will be apparent that applicant has devised a relatively simple method for repairing the teeth or serrations that are formed on the smaller ends of cone-shaped cake decorating tubes of the type described. If a tooth, or teeth, on any one of a family of cake decorating tubes of the type described is, or are, accidentally bent inwardly toward the axis of the tube, one need only to force the pointed end 12 of the member 11 through the serrated end of the tube with sufficient force to cause the errant tooth, or teeth, to be bent outwardly into the plane of the tube. On the other hand, if the tooth, or teeth, are one of a family of tubes of the type described is, or are, accidentally bent outwardly from the conical plane of the tube, one need only to insert the smaller end of the tube coaxially into another, but smaller, cone shaped tube of the type described, and thereafter force the pointed end 12 of the member 11 successively and coaxially through the serrated ends of the tubes. The resultant radial pressure created by the member 11, and the inner peripheral surface of the tube, which surrounds the errant tooth, or teeth, on the tube that is to be repaired, causes the errant teeth to be forced backwardly into the desired conical plane.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. The method of repairing inwardly bent teeth on the serrated end of a hollow conical cake decorating tube comprising
    (a) inserting the pointed end of a solid, conical member coaxially, and successively through the larger and smaller ends, respectively, of the tube, and
    (b) applying sufficient axial pressure to the base of the solid member to cause its conical surface to create a radial pressure sufficient to force the inwardly bent teeth radially outwardly into registry with the conical surface of said tube.

2. The method of repairing bent teeth on the serrated end of a hollow, conical cake decorating tube, comprising
    (a) interposing said tube between a second hollow conical member, and a solid conical member, said second hollow conical member being slightly smaller at its smaller end than the corresponding end of said tube, and surrounding the serrated end of said tube coaxially thereof, and said solid member having a maximum diameter greater than the diameter of said tube at its serrated end, and passing the pointed end of said solid member coaxially and successively through the serrated end of said tube, and the smaller end of said second hollow conical member, and
    (b) forcing said second hollow conical member and said solid member axially toward one another with sufficient force to cause said members to squeeze and bend the bent teeth of said tube into registry with the conical surface of said tube.

3. The method of repairing bent teeth on the serrated end of a hollow conical cake decorating tube, comprising
    (a) inserting the pointed end of a solid, conical member into the smaller end of said tube coaxially thereof,
    (b) inserting a second cake decorating tube over the smaller ends of said member and the first-named tube coaxially thereof, and
    (c) forcing said tubes and said member axially of said member with sufficient force to cause said member and said second tube to bend the bent teeth on said first-named tube into registry with the conical surface of said first-named tube.

References Cited
UNITED STATES PATENTS 2,906,014  9/1959  Sauber _____ 29—401

THOMAS H. EAGER, *Primary Examiner.*